(12) United States Patent
Hong

(10) Patent No.: US 9,116,548 B2
(45) Date of Patent: Aug. 25, 2015

(54) INPUT METHOD EDITOR USER PROFILES

(75) Inventor: Feng Hong, Foster City, CA (US)

(73) Assignee: Google Inc., Mountain View, CA (US)

(*) Notice: Subject to any disclaimer, the term of this patent is extended or adjusted under 35 U.S.C. 154(b) by 711 days.

(21) Appl. No.: 12/595,187

(22) PCT Filed: Apr. 8, 2008

(86) PCT No.: PCT/US2008/059673
§ 371 (c)(1),
(2), (4) Date: Mar. 3, 2010

(87) PCT Pub. No.: WO2008/124734
PCT Pub. Date: Oct. 16, 2008

(65) Prior Publication Data
US 2010/0217795 A1     Aug. 26, 2010

Related U.S. Application Data

(60) Provisional application No. 60/910,811, filed on Apr. 9, 2007.

(30) Foreign Application Priority Data

Apr. 16, 2007  (CN) .......................... 2007 1 0101814

(51) Int. Cl.
G06F 15/16     (2006.01)
G06F 3/01      (2006.01)
G06F 3/023     (2006.01)
G06F 17/22     (2006.01)

(52) U.S. Cl.
CPC ............... G06F 3/018 (2013.01); G06F 3/023 (2013.01); G06F 17/2223 (2013.01)

(58) Field of Classification Search
USPC ................................................ 707/4; 709/217
See application file for complete search history.

(56) References Cited

U.S. PATENT DOCUMENTS

| 4,459,049 A | * | 7/1984 | Howell et al. ................... 400/98 |
| 4,486,857 A | * | 12/1984 | Heckel ........................... 715/210 |
| 4,760,528 A | * | 7/1988 | Levin ............................. 715/234 |
| 4,969,097 A | * | 11/1990 | Levin ............................. 715/234 |
| 5,231,579 A | * | 7/1993 | Tsuchiya et al. .............. 715/235 |

(Continued)

FOREIGN PATENT DOCUMENTS

| CN | 1330325 A | 1/2002 |
| CN | 1490701 A | 4/2004 |

(Continued)

OTHER PUBLICATIONS

Korean Examiner Soo Cheol Lee, Notification of Transmittal of the International Search Report and the Written Opinion of the International Searching Authority, or the Declaration for Application No. PCT/US2008/059673, dated Oct. 9, 2008, 11 pages.

(Continued)

*Primary Examiner* — Alicia Baturay
(74) *Attorney, Agent, or Firm* — Remarck Law Group PLC (57) ABSTRACT

Methods, systems, and apparatus, including computer program products, in which an input method editor (IME) communicates with a central data store and stores user data, e.g., typing patterns and user-generated words associated with the user, in a user profile. A client device associated with the user may instantiate an IME environment and access the user profile by a client login over a network.

15 Claims, 3 Drawing Sheets

(56) References Cited

U.S. PATENT DOCUMENTS

| | | | | |
|---|---|---|---|---|
| 5,305,205 A * | 4/1994 | Weber et al. | | 715/234 |
| 5,623,406 A * | 4/1997 | Ichbiah | | 704/3 |
| 5,634,084 A * | 5/1997 | Malsheen et al. | | 704/260 |
| 5,635,918 A * | 6/1997 | Tett | | 340/7.29 |
| 5,663,958 A * | 9/1997 | Ward | | 370/347 |
| 5,691,708 A * | 11/1997 | Batchelder et al. | | 340/7.29 |
| 5,850,565 A * | 12/1998 | Wightman | | 710/1 |
| 5,911,485 A * | 6/1999 | Rossmann | | 341/22 |
| 5,928,325 A * | 7/1999 | Shaughnessy et al. | | 709/206 |
| 5,991,751 A * | 11/1999 | Rivette et al. | | 1/1 |
| 6,003,050 A | 12/1999 | Silver et al. | | |
| 6,014,429 A * | 1/2000 | LaPorta et al. | | 379/88.15 |
| 6,081,815 A * | 6/2000 | Spitznagel et al. | | 715/205 |
| 6,084,952 A * | 7/2000 | Beerman et al. | | 379/93.25 |
| 6,088,699 A * | 7/2000 | Gampper et al. | | 1/1 |
| 6,150,962 A * | 11/2000 | Rossmann | | 341/22 |
| 6,205,342 B1 * | 3/2001 | Oakes et al. | | 455/566 |
| 6,223,059 B1 * | 4/2001 | Haestrup | | 455/566 |
| 6,275,789 B1 * | 8/2001 | Moser et al. | | 704/7 |
| 6,279,018 B1 * | 8/2001 | Kudrolli et al. | | 715/234 |
| 6,286,053 B1 * | 9/2001 | Van Peursem et al. | | 709/247 |
| 6,323,767 B1 * | 11/2001 | Gropper | | 340/534 |
| 6,349,202 B1 * | 2/2002 | Odamura | | 455/412.1 |
| 6,442,523 B1 * | 8/2002 | Siegel | | 704/270 |
| 6,473,621 B1 * | 10/2002 | Heie | | 455/466 |
| 6,525,676 B2 * | 2/2003 | Kisaichi et al. | | 341/22 |
| 6,553,103 B1 * | 4/2003 | Forlenza et al. | | 379/93.01 |
| 6,556,841 B2 * | 4/2003 | Yu | | 455/556.1 |
| 6,580,917 B1 * | 6/2003 | Lefevre et al. | | 455/466 |
| 6,606,373 B1 * | 8/2003 | Martin | | 379/88.01 |
| 6,700,503 B2 * | 3/2004 | Masar et al. | | 340/870.01 |
| 6,751,209 B1 * | 6/2004 | Hamiti et al. | | 370/349 |
| 6,795,822 B1 * | 9/2004 | Matsumoto et al. | | 1/1 |
| 6,804,675 B1 * | 10/2004 | Knight et al. | | 707/754 |
| 6,816,578 B1 * | 11/2004 | Kredo et al. | | 379/88.17 |
| 6,889,222 B1 | 5/2005 | Zhao | | |
| 6,901,364 B2 * | 5/2005 | Nguyen et al. | | 704/235 |
| 6,934,767 B1 * | 8/2005 | Jellinek | | 709/247 |
| 6,950,881 B1 * | 9/2005 | Ndili | | 709/246 |
| 6,985,721 B1 * | 1/2006 | Khorram | | 455/414.1 |
| 6,989,765 B2 * | 1/2006 | Gueziec | | 340/905 |
| 7,010,478 B2 * | 3/2006 | Mathur et al. | | 704/9 |
| 7,082,312 B2 * | 7/2006 | Zhang et al. | | 455/466 |
| 7,315,902 B2 * | 1/2008 | Kirkland | | 709/247 |
| 7,403,888 B1 * | 7/2008 | Wang et al. | | 704/2 |
| 7,509,263 B1 * | 3/2009 | Fiedotin et al. | | 705/3 |
| 2002/0019243 A1 * | 2/2002 | Zhang et al. | | 455/466 |
| 2002/0075300 A1 | 6/2002 | Tang et al. | | |
| 2002/0169770 A1 * | 11/2002 | Kim et al. | | 707/5 |
| 2002/0184270 A1 * | 12/2002 | Gimson | | 707/529 |
| 2003/0003931 A1 * | 1/2003 | Silventoinen et al. | | 455/466 |
| 2003/0139921 A1 * | 7/2003 | Byrd et al. | | 704/10 |
| 2004/0122979 A1 * | 6/2004 | Kirkland | | 709/247 |
| 2005/0124324 A1 * | 6/2005 | Thomas et al. | | 455/412.1 |
| 2005/0240391 A1 * | 10/2005 | Lekutai | | 704/2 |
| 2006/0007157 A1 | 1/2006 | Li et al. | | |

FOREIGN PATENT DOCUMENTS

| | | |
|---|---|---|
| KR | 20020012831 A | 2/2002 |
| KR | 10-2006-0087823 | 8/2006 |

OTHER PUBLICATIONS

English translation of Chinese Office Action from Chinese Patent Application No. 200710101814.4, dated Aug. 24, 2011, 6 pages.

New ways of using free web software, Image processing, table calculation, scheduling, and Japanese inputting, etc., Ajax IME Japanese inputting which is convenience at overseas net cafes, Yomiuri PC, Apr. 1, 2007, vol. 12, No. 4, p. 59, Tokyo head office of the Yomiuri Shimbun, Japan.

Ochiai, T., Introduction to power up a PC, Introduction to completely back up data and configurations for standard software, Let's try it when renewing a personal computer! It is safety if doing it every day, Monthly ASCII PC, vol. 3, No. 11, pp. 54-61, ASCII Corporation, Nov. 1, 2000, Japan.

Resovling troublesome operations at once!! Let's completely master automation techniques for Windows XP and applications, PC fan, vol. 12, No. 2, pp. 40-43, Mainichi Communications, Inc., Feb. 1, 2005, Japan.

Yanagiya, T., The technique "The Waza"—Let's use ATOK, ASCII, vol. 29, No. 8, pp. 185-187, ASCII Corporation, Aug. 1, 2005, Japan.

"Never Lose Anything on the Net, LAN, or RAID! Triple Backup Techniques for the Most Important Data", ASCII PC, ASCII Corporation, Mar. 1, 2006, vol. 9, No. 3, pp. 22-27.

* cited by examiner

INPUT METHOD EDITOR USER PROFILES

This application claims the benefit of priority of U.S. Provisional Patent application No. 60/910,811, filed on Apr. 9, 2007, and China Application 200710101814.4, filed on Apr. 16, 2007, the entire disclosures of which are incorporated herein by reference.

BACKGROUND

This disclosure relates to input methods.

Languages that use a logographic script in which one or two characters correspond roughly to one word or meaning have more characters than keys on a standard input device, such as a computer keyboard or a mobile device keypad. For example, the Chinese language contains tens of thousands of characters having pronunciations defined by base Pinyin elements and five tones. The mapping of these potentially many to one associations can be implemented by input methods that facilitate entry of characters and symbols not found on input devices. Accordingly, a Western style keyboard can be used to input Chinese characters. Likewise, input methods can be used for using a Western style keyboard or some other input device to input many other languages that include ideograms, such as the Japanese language, the Korean language, and other languages.

Some input method editors can adapt to the typing habits of a particular user and store the user data in a local data store, such as a persistent memory on a computer device, e.g., a hard drive or a flash memory. Such user data can, for example, include typing frequency for different words, unique words, often-used phrases, etc. The learned data facilitates an optimized input method editor environment for the user. When a user, however, utilizes the input method editor on another computer device, the user data is not available to the input method editor.

SUMMARY

This specification describes technologies related to user profiles for input method editors. The user profiles can be stored in an input method editor server data store. The user profiles can include composition data, e.g., typing patterns and user-generated words associated with the user. A client device associated with the user may instantiate an IME (input method editor) environment and access the user account by a client login over a network. The editor can be instantiated in a variety of ways, including by launching the editor as a program on the client device, by launching it as a script, e.g., a JavaScript script, within a web browser; and instantiating can also including downloading the program or script to a client device before it is launched.

In general, one aspect of the subject matter described in this specification can be embodied in methods in which user composition data for an input method editor are stored in user profiles. A notification of an input method editor user instantiation can be received, and a corresponding user profile based on the input method editor user instantiation can be identified. User composition data associated with the corresponding user profile can be provided to the input method editor user instantiation. Other embodiments of this aspect include corresponding systems, apparatus, and computer program products.

Another aspect of the subject matter described in this specification can be embodied in methods in which an input method editor instance is generated, and a notification of the input method editor instance is transmitted to an input method editor server. User composition data associated with the input method editor instance can be received in response and stored. Other embodiments of this aspect include corresponding systems, apparatus, and computer program products.

Another aspect of the subject matter described in this specification can be embodied in methods in which user composition data is stored in input method editor user profiles. Each input method editor user profile is associated with a corresponding user, each corresponding user having generated the composition data stored in the associated input method editor user profile. A notification of an input method editor instance associated with a user that is one of the corresponding users is received from one or more remote computer devices, and the input method editor user profile associated with the user is provided to the one or more remote computing device in response. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
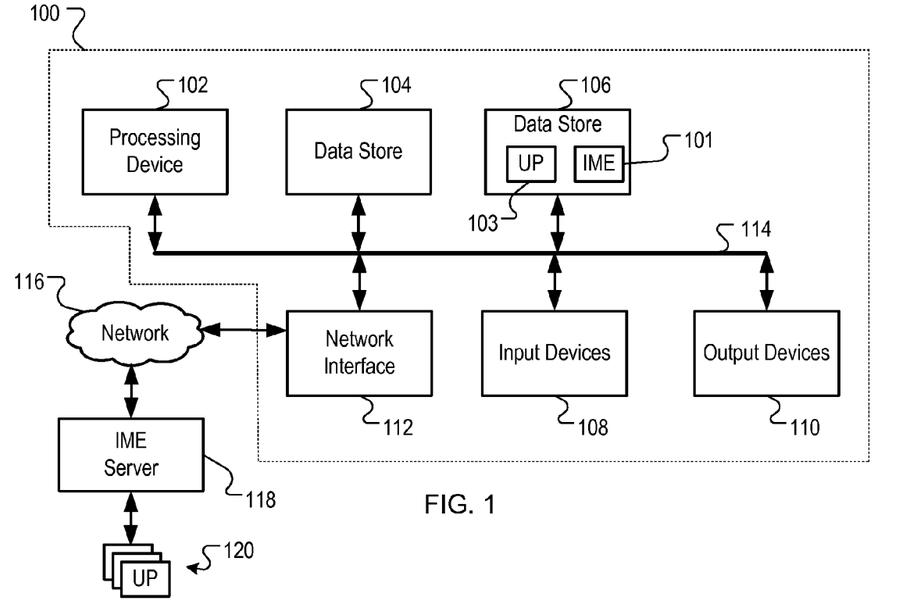
FIG. 1 is a block diagram of an example environment that can be utilized to implement the systems and methods described herein.

FIG. 1 is a block diagram of an example environment that can be used to implement the systems and methods described herein. The environment can include a client system 100 that can, for example, be a computer device, such as a personal computer device, or other electronic devices, such as a mobile phone, mobile communication device, personal digital assistant (PDA), and the like.

The example system 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other example system architectures, however, can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the system 100 stores an input method editor (IME) 101 in a data store, such as the data store 106. The IME 101 can include instructions that upon execution cause the processing device 102 to carry out input method editing function. The system 100 can receive composition inputs for input characters or symbols, such as, for example, Hanzi characters. For example, the user can use one or more of the input devices 108 (e.g., a keyboard, such as a Western-style keyboard, a stylus with handwriting recognition engines, etc.) to input composition inputs for identification of Hanzi characters. In some examples, a Hanzi character can be composed of more than one composition input. Various IMEs are available for converting composition inputs into Hanzi characters. Each of the IMEs can have, for example, different composition inputs representing a same Hanzi character, depending on the implementation of the IME. For example, the same Hanzi character can be associated with different composition inputs in a Pinyin IME.

In some implementations, the system 100 can receive one or more Pinyin composition inputs and convert the composition inputs into Hanzi characters. The Pinyin IME can, for example, use compositions of Pinyin syllables or characters received from keystrokes to represent the Hanzi characters. Each Pinyin syllable can, for example, correspond to one or more keystrokes in the western keyboard. Using the Pinyin IME, a user can input a Hanzi character by using composition inputs that includes one or more Pinyin syllables representing the sound of the Hanzi character.

The first data store 104 and/or the second data store 106 can store an association of composition inputs and characters. Based on a user input, the processing device 102 can use information in the data store 104 and/or the data store 106 to identify one or more candidate characters represented by the input. In some implementations, if more than one candidate character is identified, the candidate characters are displayed on an output device 110. Using the input device 108, the user can select from the candidate characters a Hanzi character that the user desires to input.

In some implementations, the IME 101 can be configured to store composition data that can be used to modify the behavior of an input method editor to be tailored for particular user. Example composition data can be data that is defined by user behavior, e.g., typing habits, frequently used phrases, unique words, etc., associated with a user. Other data that can be used to customize the behavior of an input method editor can also be used. Such composition data can be stored in a user profile 103, e.g., the composition data can be a subset of a user profile. The user profile 103 can thus define a user environment for the user of the IME 101 that is optimized for the user. For example, in the absence of a user profile 103, the IME 101 may select five candidate characters for a particular combination of keystrokes; however, by utilizing the composition data stored in the user profile, the IME 101 may determine that only three characters are likely candidates for the user.

In some implementations, an IME server 118 having access to the system 100 can be used to store user profiles (UP) 120 for many users. For example, a user may use a first system 100 in a first environment, e.g., a home client computer; and may use a second system 100 in another environment, e.g., a work client computer; and may use a third system 100 in a third environment; e.g., a mobile computer with wireless access.

The user profile 103 of the user may be stored in the user profiles 120 of the IME server 118. For example, in one implementation, when the user of the system 100 instantiates the input method editor 101 and generates an input method editor instance on a system, e.g., a work computer, a notification of the input method editor 101 instance can be transmitted to the input method editor server 118. As the user profile 103 is generated or updated on the system 100, the user profile 103 may likewise be generated or updated on the IME server 118 and stored as one of the user profiles 120. The user profile data 103 stored as one or the user profiles 120 on the IME server 118 can, for example, be stored as a master user profile.

Should the user instantiate the input method editor 101 and generate an input method editor instance on another system 100, e.g., a home computer, a notification of the input method editor 101 instance can be transmitted to the input method editor server 118. The corresponding master user profile stored as one or the user profiles 120 in the IME server 118 can thus be utilized to synchronize user profile 103 of the system 100 with the master user profile stored at the IME server 118.

During an input method editor 101 instance on a system 100, addition composition data for a user can be learned. Accordingly, the additional composition data can be stored in the user profile 103 on the system 100, and can also be provided to a corresponding master user profile stored as one of the user profiles 120 on the IME server 118.

Figure 2:
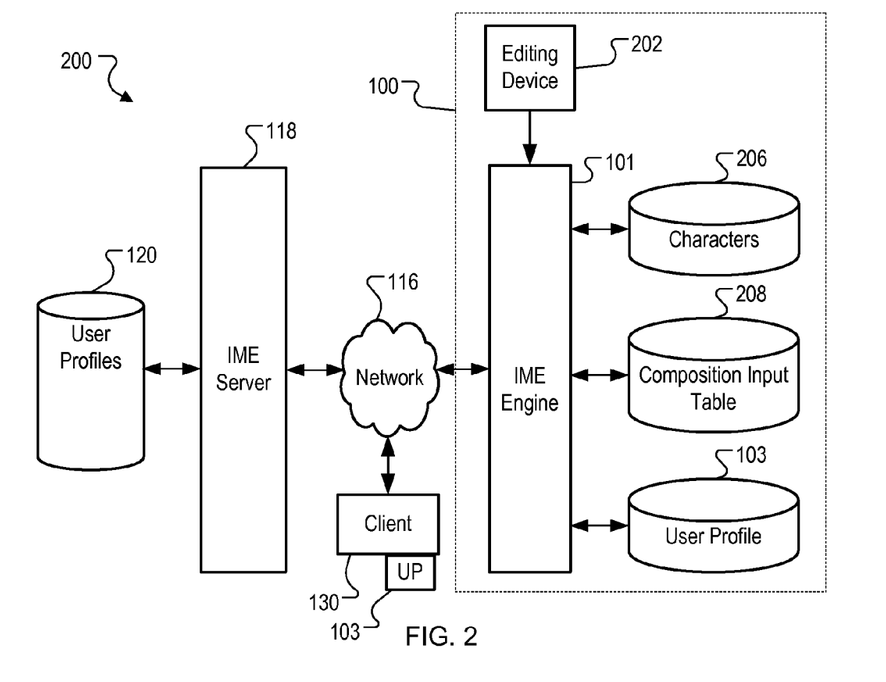
FIG. 2 is a block diagram of an input method editor profile environment.

FIG. 2 is a more detailed block diagram of an input method editor profile environment 200. The system 100 includes an editing device 202, the IME 101, a character data store 206, a composition input data store 208, and the user profile 103. A second system 130 that is substantially similar to the system 100 is also included in the environment 200. The second system 130 can, for example, be another computer system associated with a user, e.g., system 100 is a user's home computer, and system 130 is a user's work computer.

The editing device 202 and the IME 101 can, for example, be defined by instructions executable by the processing device 102. A user can use the editing device 202 to edit a text containing logographic script. The editing device 202 can be word processing software that receives user input and displays text to be edited.

The IME 101 can, for example, be an IME that identifies a user, e.g., an IME that may detect a user session and/or may require a user login and the associated user data 103. The character data store 206 and the composition input data store 208, can, for example, also be stored in the data store 104 and/or the data store 106. The character data store 206 includes characters of a logographic script used in the editing device 202. In some implementations, the character data store 206 also includes information about relationships between characters. For example, the character data store 206 can include scores or probability values assigned to a character depending on characters adjacent to the character. Other contextual relation data can also be used.

The composition input data store 208 includes an association of composition inputs and the characters stored in the character data store 206. In some implementations, the composition input data store 208 can link each of the characters in the character data store 206 to a composition input used by the input engine 204. For example, the input engine 204 can utilize the information in the character data store 206 and the composition input data store 208 to associate and/or identify one or more characters in the character data store 206 with one or more composition inputs in the composition input data store 208.

In some implementations, the input engine 204 can identify candidate characters based on a composition input and characters adjacent to a selected character or adjacent to a cursor position. The editing device 202 can receive a selection of a character in the logographic script, such as, for example, a selection of a character to be changed or modified. In some implementations, a user can select to change a Hanzi character in a plurality of Hanzi characters in the editing device 202 and provide one or more composition inputs to the editing device 202. Selection information, such as the selected character, can be provided to the input engine 204. Based on such inputs and selections, a user can enter a desired character in an editing session.

In some implementations, the user data 210 can store composition data associated with the user. Such composition data can include typing patterns and user-generated words associated with the user, or other data defined by a user's behavior. The composition data can thus be accessed by the IME 101 to facilitate the selection of candidate characters based, in part, on a particular user's typing history.

In some implementations, an input method editor instance can be generated by the system 100. In one implementation, the input method editor instance is generated when the IME engine 101 is, for example, loaded onto the system 100. For example, if the IME server 118 can transmit the IME engine 101 to the system 100 for download, then a download process can generate an input method editor instance. In other implementations, launching the IME engine 101 on the system 100 can generate an input method editor instance.

A notification of the input method editor instance can be transmitted to the IME server 118. The IME server 118 can, for example, generate a user profile for the user of the system 100 and store the corresponding user profile 103 in the user profiles 120.

The IME engine 101 can, for example, store composition data for a user in the user profile 103. Additionally, the IME engine 101 can, for example, provide the user profile 103 to the IME server 118, and the IME server 118 can store the user profile 103 in the user profiles 120 as a master user profile.

After each input session that utilizes the IME engine 101, the local user profile 103 can be updated, and update data can be provided to the IME server 118. The IME server 118 can, for example, update the corresponding user profile stored in the user profiles 120.

Thereafter, if a user associated with the user profile 103 instantiates the IME engine 101 on a second system 130, e.g., the user's work computer, the IME engine 101 can provide a notification of the input method editor instance, e.g., a user identification, to the IME server 118. The IME server 118, in turn, can provide and/or update the local user profile 103 in the second system 130. Accordingly, the systems 100 and 130 can, for example, be synchronized with respect to the composition data stored in the user profile 103.

Thus, if a user has been utilizing the IME engine 101 on a first system, such as the system 100, for a period of time such that the user's environment is optimized, the user can experience the same optimization on a second system, e.g., the system 130, by downloading the user profile 103 stored in the user profiles 120. Additionally, the IME server 118 and user profiles 120 facilitate a similar user experience on multiple client systems for the IME engine 101, as any client system utilizing the IME engine 101 can readily download the user profile 103.

In some implementations, the user profile 103 stored in the user profiles 120 is downloaded from the IME server 110 automatically by the IME engine 101 upon the user providing a user identifier, e.g., logging into an IME session with a unique identifier. In other implementations, the user profile 103 stored in the user profiles 120 is downloaded from the IME server 110 only upon approval by the user.

In some implementations, the IME engine 101 communicates with the IME server 118 periodically, e.g., daily, pursuant to a synchronization process. For example, system 100 may communicate with an IME server 118 daily and download the latest user profile data for a user. In some implementations, the synchronization process can be carried out in response to receiving a synchronization request with the user identifier.

In some implementations, user profiles 103 for a user may be stored on multiple computer devices, e.g., a work computer, a home computer, etc. The synchronization process can be utilized to update a corresponding master user profile stored in the user profiles 120. For example, during an input method editor 101 instance on a system 100, addition composition data for a user can be learned. Accordingly, the additional composition data can be provided to a corresponding master user profile stored as one of the user profiles 120 on the IME server 118.

Figure 3:
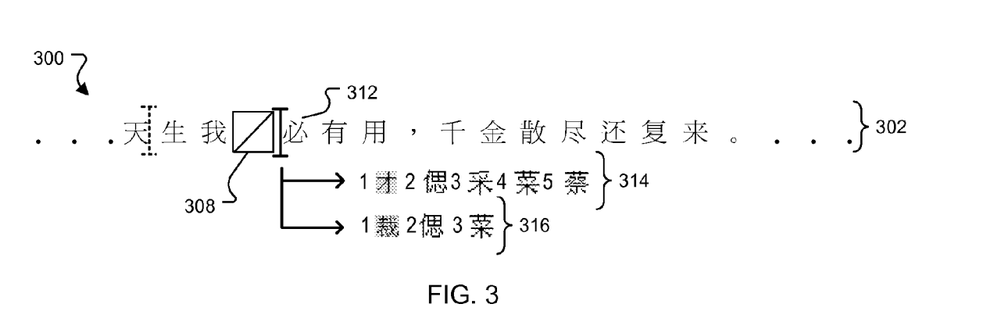
FIG. 3 is a schematic diagram of an editing environment for Hanzi characters based on user profile data.

FIG. 3 is a schematic diagram of an editing environment for Hanzi characters based on user profile data. The Hanzi characters 302 include a character 308 that is currently being edited in the input session. Based on a composition input, candidate characters can be identified for the selected character 308.

A first set of candidate characters 314 is identified as a default set, e.g., a character set based on an IME algorithm with a null set of composition data for a user. For example, the first set of candidate characters 314 may be an initial set for the given character string 302 when the IME is first used by a user, or with the IME is used by a user that has not provided a user identification to the IME.

A second set of candidate characters 316 is identified based on the composition input and a user profile 103 for a user. Accordingly, the second set of candidate characters 316 can be generated for a user environment based on user profile data for a particular user. Thus, by downloading user profile data from the IME server, a user may readily optimize a client device to the user's particular typing behavior.

Figure 4:
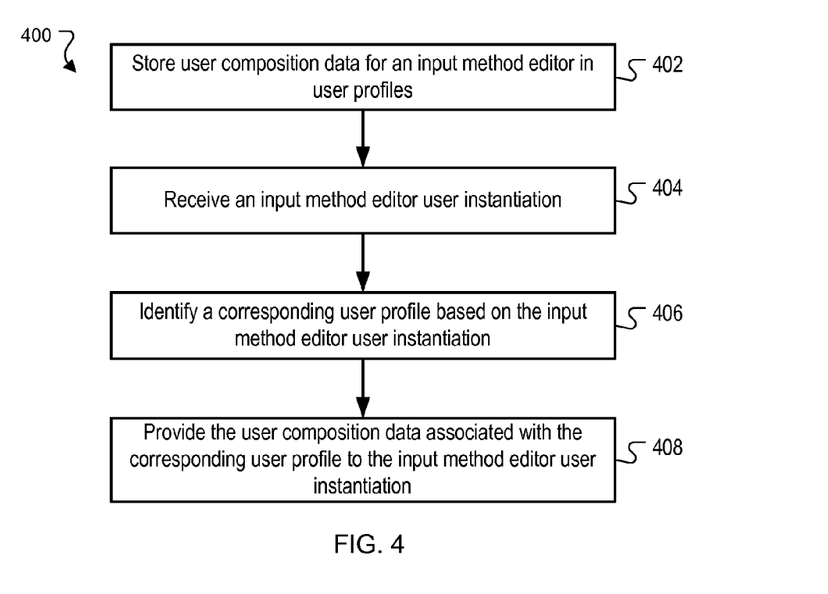
FIG. 4 is a flow diagram of an example process for providing input method editor user profile data.

FIG. 4 is a flow diagram of an example process 400 for providing user input method editor user profile data. The process 400 can, for example, be implemented in an environment 100 of FIG. 1 or 200 of FIG. 2.

The process 400 stores user composition data for an input method editor in user profiles (402). For example, the IME server 118 can store typing patterns and user-generated words associated with users in user profiles 120.

The process 400 receives a notification of an input method editor user instantiation (404). For example, the IME server 118 can receive a notification of an input method editor user instantiation for an IME engine 101 that includes a user identifier.

The process 400 identifies a corresponding user profile based on the input method editor user instantiation (406). For example, the IME server 118 can identify a corresponding user profile for the identifier user in the user profiles 120.

The process 400 provides the user composition data associated with the corresponding user profile to the input method editor user instantiation (408). For example, the IME server 118 can provide user profile data, e.g., composition data, associated with the identified user to a client device that provided the input method editor user instantiation.

Figure 5:
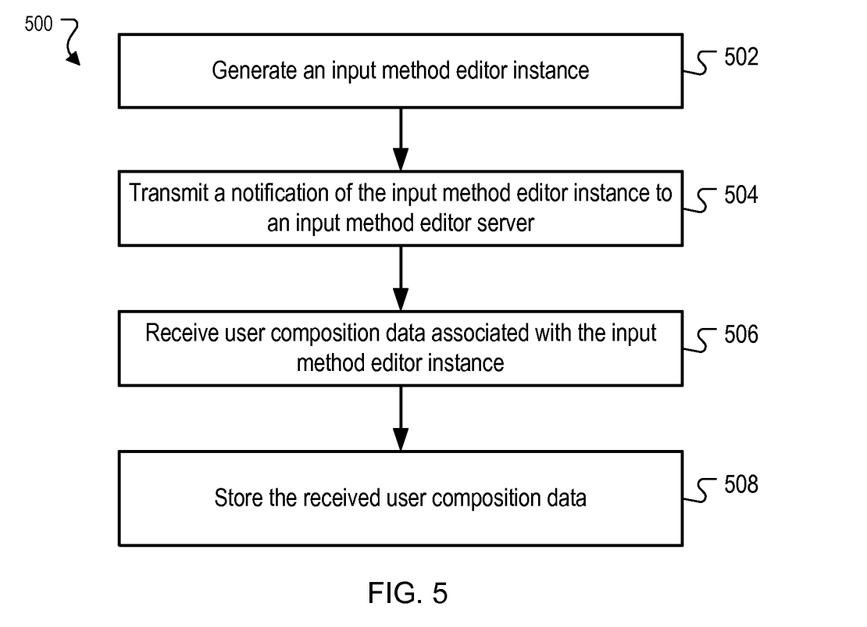
FIG. 5 is a flow diagram of another example process for providing input method editor user profile data.

FIG. 5 is a flow diagram of an example process 500 for providing user input method editor user profile data. The process 500 can, for example, be implemented in an environment 100 of FIG. 1 or 200 of FIG. 2.

The process 500 generates an input method editor instance (502). For example, an IME engine 101, upon launching, can generate an input method editor instance for an identified user.

The process 500 transmits a notification of the input method editor instance to an input method editor server (504). For example, the IME engine 101 can provide a user identifier to the IME server 118.

The process 500 receives user composition data associated with the input method editor instance (506). For example, the IME engine 101 can receive composition data associated with the user identifier, e.g., user profile data for an identified user of a device upon which the IME engine 101 is instantiated.

The process 500 stores the received user composition data (508). For example, the IME engine 101 can store the received user composition data in a user profile 103. Although described in the context of particular language and input method examples, the systems and methods described herein can be used for any language that utilizes a logographic script. For example, the systems and methods described herein can be used for many other languages that include ideograms, such as the Japanese language, the Korean language, and other languages.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
storing, at an input method editor server, one or more user profiles for an input method editor, each of the one or more user profiles corresponding to a particular user and including user composition data utilized to modify behavior of the input method editor for the particular user;
receiving, at the input method editor server, a notification of an input method editor user instantiation from a client computer device associated with a first user, the notification of the input method editor user instantiation including a user identifier corresponding to the first user;
identifying, at the input method editor server, a first user profile of the one or more user profiles corresponding to the first user based on the input method editor user instantiation;
providing, from the input method editor server, the first user profile to the input method editor user instantiation on the client device, wherein user composition data of the first user profile is usable by the input method editor user instantiation on the client device to modify behavior of the input method editor user instantiation to be tailored for the first user;
receiving, at the input method editor server, an updated first user profile for the first user from the client device, the updated first user profile including updated user composition data related to behavior of the first user and the input method editor user instantiation; and
storing, at the input method editor server, the updated first user profile as the first user profile,
wherein receiving the notification of the input method editor user instantiation comprises receiving a request to download the user composition data of the first user profile, and
wherein the composition data for the particular user comprises at least one of: (i) data defined by behavior of the particular user, (ii) user-generated words associated with the particular user, (iii) typing patterns associated with the particular user, (iv) frequently used phrases of the user, and (v) search history data of the user.

2. A computer-implemented method, comprising:
storing, at an input method editor server, one or more user profiles for an input method editor, each of the one or more user profiles corresponding to a particular user and including user composition data utilized to modify behavior of the input method editor for the particular user, wherein the user composition data for the particular user comprises data defined by behavior of the particular user including at least one of (i) user-generated words associated with the particular user and (ii) typing patterns associated with the particular user;
receiving, at the input method editor server, a notification of an input method editor user instantiation from a client computer device associated with a first user, the notification of the input method editor user instantiation including a user identifier corresponding to the first user;
identifying, at the input method editor server, a first user profile of the one or more user profiles corresponding to the first user based on the input method editor user instantiation;
providing, from the input method editor server, the first user profile to the input method editor user instantiation on the client device, wherein user composition data of the first user profile is usable by the input method editor user instantiation on the client device to modify behavior of the input method editor user instantiation to be tailored for the first user;
receiving, at the input method editor server, an updated first user profile for the first user from the client computer device, the updated first user profile including updated user composition data related to behavior of the first user and the input method editor user instantiation; and
storing, at the input method editor server, the updated first user profile as the first user profile.

3. The computer-implemented method of claim 2, wherein receiving the notification of the input method editor user instantiation comprises receiving a request to download the user composition data of the first user profile.

4. The computer-implemented method of claim 2, wherein receiving a notification of an input method editor user instantiation comprises receiving an input method editor profile synchronization request.

5. A computer-implemented method, comprising:
generating, at a client computer device associated with a user, an input method editor instance;

transmitting, from the client computer device, a notification of the generation of the input method editor instance to an input method editor server, wherein receipt of the notification of the generation of the input method editor instance causes the input method editor server to identify a first user profile of one or more user profiles corresponding to the user based on the input method editor user instance, each user profile including user composition data comprising data defined by behavior of the user including at least one of (i) user-generated words associated with the user and (ii) typing patterns associated with the user;

in response to transmitting the notification of the generation of the input method editor instance, receiving, at the client computer device and from the input method editor server, the first user profile corresponding to the user, the first user profile including user composition data that is usable by the client computer device to modify behavior of the input method editor user instance to be tailored for the user;

storing, at the client computer device, the first user profile including the user composition data;

receiving, at the client computer device, updated user composition data related to behavior of the user and the input method editor user instance; and transmitting, from the client computer device to the input method editor server, the updated user composition data, wherein receipt of the updated user composition data causes the input method editor server to (i) update the first user profile to obtain an updated first user profile and (ii) store an updated first user profile as the first user profile.

6. The computer-implemented method of claim 5, wherein:

generating the input method editor instance comprises (i) launching an input method editor, and (ii) accessing a user identifier associated with the input method editor instance, the user identifier corresponding to the user; and transmitting the notification of the generation of the input method editor instance to the input method editor server comprises transmitting the user identifier to the input method editor server.

7. The computer-implemented method of claim 5, wherein generating the input method editor instance comprises transmitting a synchronization request with a user identifier to the input method editor server, the user identifier associated with the input method editor instance and corresponding to the user.

8. The computer-implemented method of claim 5, wherein the user composition data further comprises frequently used phrases of the user.

9. The computer-implemented method of claim 5, wherein the user composition data further comprises search history data of the user.

10. The computer-implemented method of claim 5, wherein transmitting the notification of the generation of the input method editor instance to the input method editor server comprises requesting to download the user composition data of the user profile.

11. A system, comprising:

a data store configured to store input method editor user profiles, each of the input method editor user profiles corresponding to a particular user and including user composition data utilized to modify behavior of an input method editor for the particular user, wherein the user composition data for the particular user comprises data defined by behavior of the particular user including at least one of (i) user-generated words associated with the particular user and (ii) typing patterns associated with the particular user; and an input method editor server comprising one or more computers and in data communication with the data store, the input method editor server being configured to:

(i) receive, from one or more client computer devices, a notification of an input method editor instance associated with a first user, (ii) provide a first input method editor user profile associated with the first user to the one or more client computer devices, wherein the provided first input method editor user profile is usable by the input method editor instance on the one or more client computing devices to modify behavior of the input method editor instance to be tailored for the first user, and (iii) receive, from the one or more client computer devices, an updated first input method editor user profile for the first user from the one or more client computer devices, the updated first input method editor user profile including updated user composition data related to behavior of the first user and the input method editor user instance, and wherein the data store is further configured to store the updated first input method editor user profile as the first input method editor user profile.

12. The system of claim 11, wherein the notification of the input method editor instance comprises a request to download user composition data of the first input method editor user profile.

13. The system of claim 11, wherein the notification of the input method editor instance comprises an input method editor profile synchronization request.

14. The system of claim 11, wherein the user composition data further comprises frequently used phrases of the user.

15. The system of claim 11, wherein the user composition data further comprises search history data of the user.

* * * * *